May 6, 1958

R. B. JOHNSON 2,833,472

ACCUMULATING DEVICE

Filed June 26, 1953

INVENTOR
REYNOLD B. JOHNSON

BY

ATTORNEY

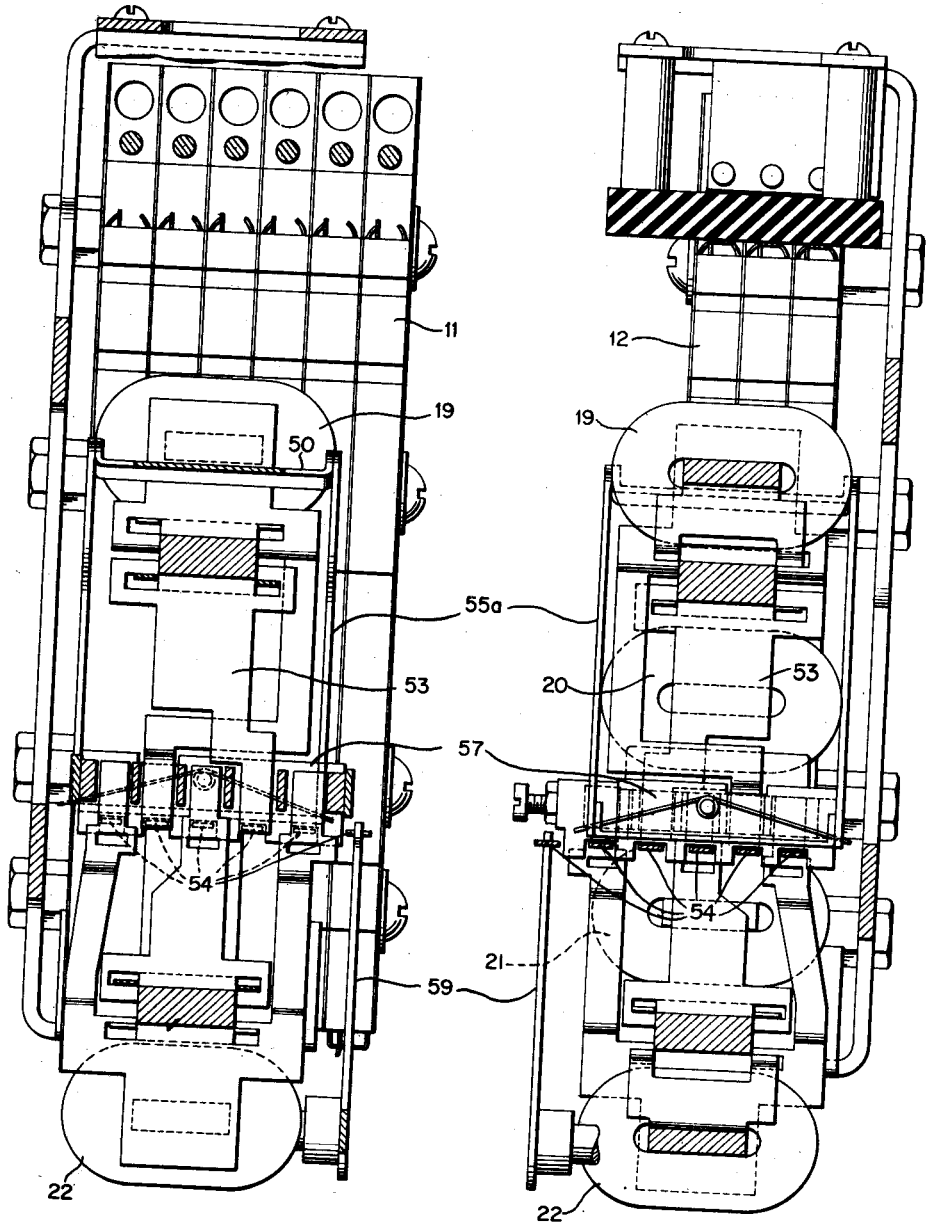

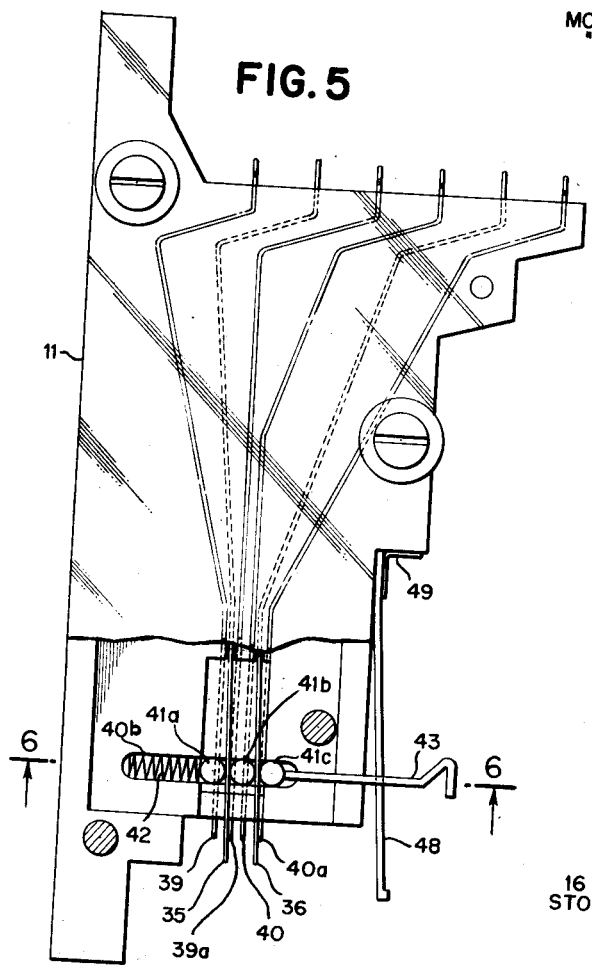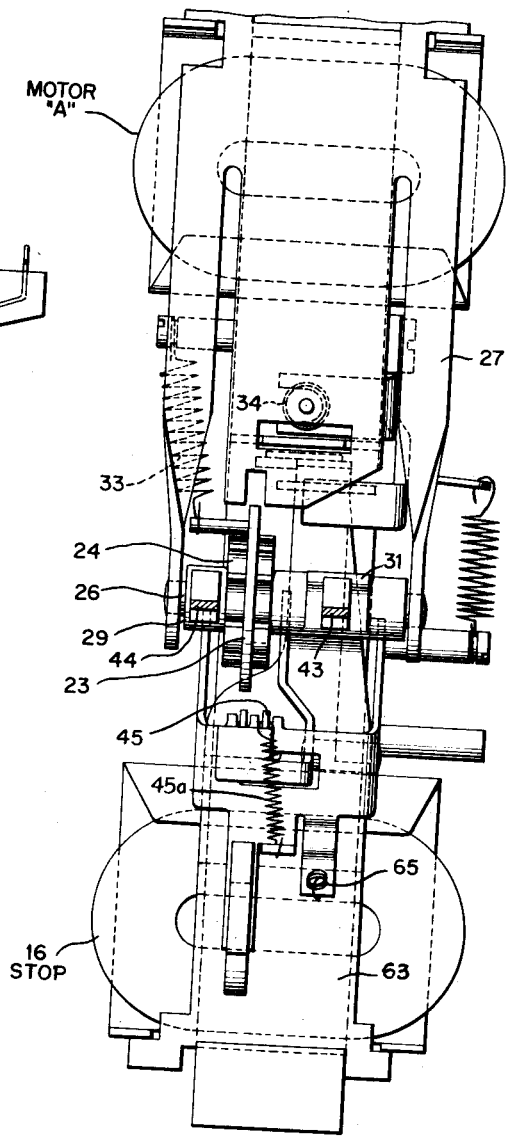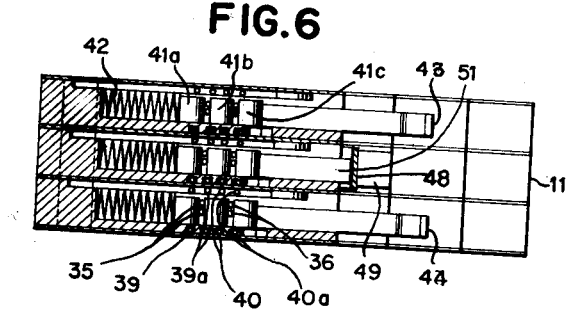

May 6, 1958 R. B. JOHNSON 2,833,472
ACCUMULATING DEVICE
Filed June 26, 1953 8 Sheets-Sheet 4

INVENTOR
REYNOLD B. JOHNSON
BY
ATTORNEY

May 6, 1958 R. B. JOHNSON 2,833,472
ACCUMULATING DEVICE
Filed June 26, 1953 8 Sheets-Sheet 5

INVENTOR
REYNOLD B. JOHNSON
BY
ATTORNEY

United States Patent Office 2,833,472
Patented May 6, 1958

2,833,472
ACCUMULATING DEVICE

Reynold B. Johnson, Palo Alto, Calif., assignor to International Business Machines Corporation, New York, N. Y., a corporation of New York Application June 26, 1953, Serial No. 364,414

10 Claims. (Cl. 235—61.6)

This invention relates to an electro-mechanical calculating device. More particularly it relates to a high-speed impulse type accumulator such as that commonly used in electric accounting machines.

One of the objects of this invention is to provide a compact self-contained accumulator.

Another object is to provide a high-speed accumulator having the least number of moving parts. The shorter travel and lower inertia of moving parts permits a more rapid calculation from electrical impulses with very little wear and maintenance.

Another object is to provide an accumulator capable of receiving positive or negative data by electrical impulse and directly translating that data into discreet step-by-step rotation of a counter wheel in a corresponding positive or negative direction. This is accomplished by a pair of cooperating gears. One of the gears has external teeth and rotates freely about its pivotally mounted axis. The other gear, the so-called driving gear, has internal teeth and while its axis pivots in an arc, it is not free to rotate. The external toothed-gear is mounted within the internal toothed-gear in a cooperative position. By alternately pivoting the respective gears through an arc, one station or increment of rotation of the driven or rotatable gear is attained. Depending upon the sequence of the alternately successive pivoting of the cooperating gears, this one station rotation occurs in either a clockwise direction or a counterclockwise direction. One direction of step-by-step rotation represents positive quantities of the magnitude represented by the number of increments so entered while the other direction of rotation represents negative quantities.

Still another object of the invention is to provide an accumulator capable of performing the following operations: Adding and subtracting intelligence received from the punched hole of the well known IBM record card; reading out such data in a recognizable form with a re-positioning of the accumulator to the home position; or reading out such data without a resetting of the accumulator.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a side elevation of the assembled accumulating device shown in Fig. 1 taken along the line 2—2.

Fig. 3 is a side elevation of the assembled accumulating device shown in Fig. 1 taken along the line 3—3.

Fig. 4 is a side elevation of the assembled accumulating device shown in Fig. 1 taken along line 4—4.

Fig. 5 is a view of one of the contact point transfer units with one of the laminations of the insulated housing partially broken away.

Fig. 6 is an end section of Fig. 5 taken along the line 6—6.

Figure 8A:
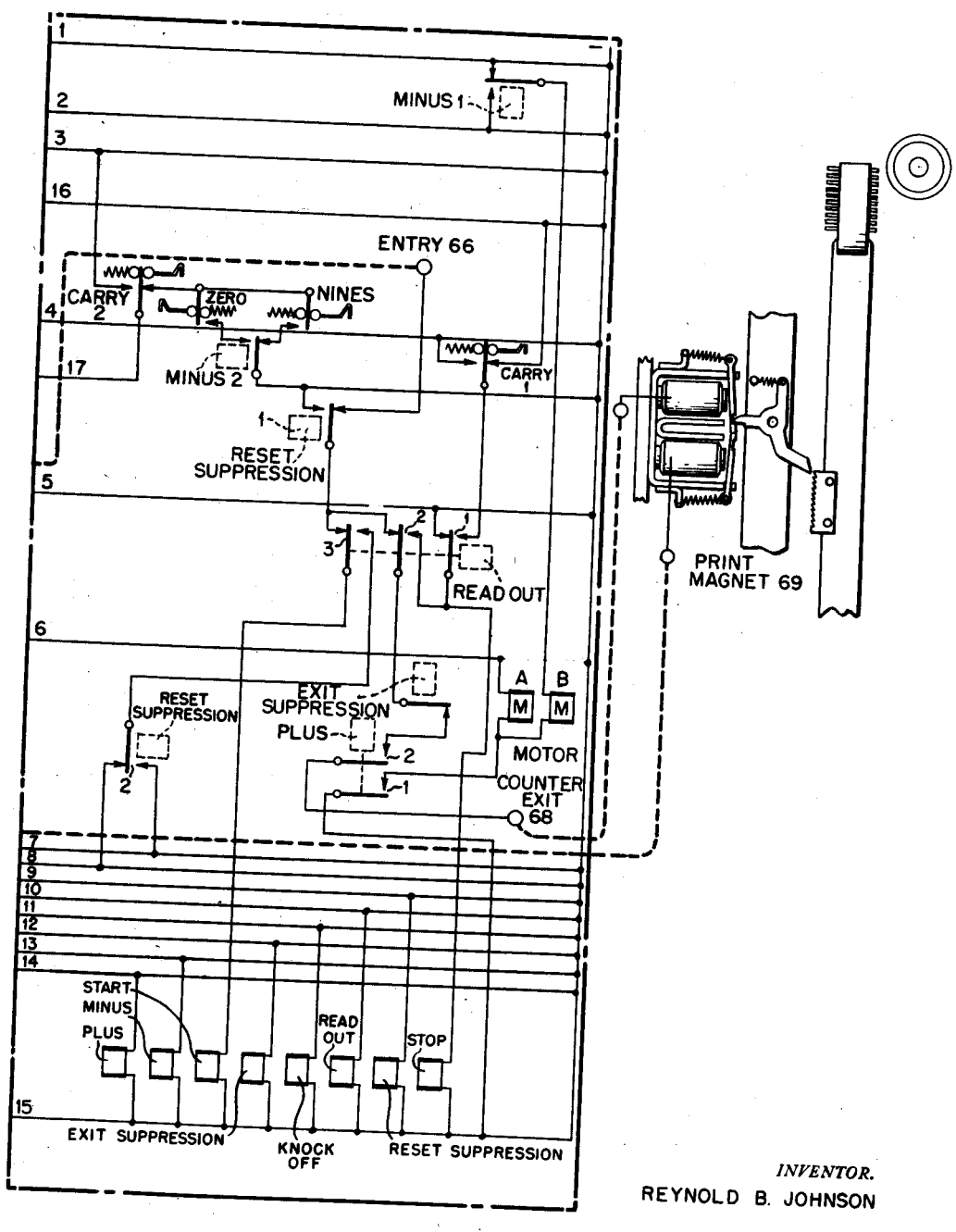
Figure 8B:
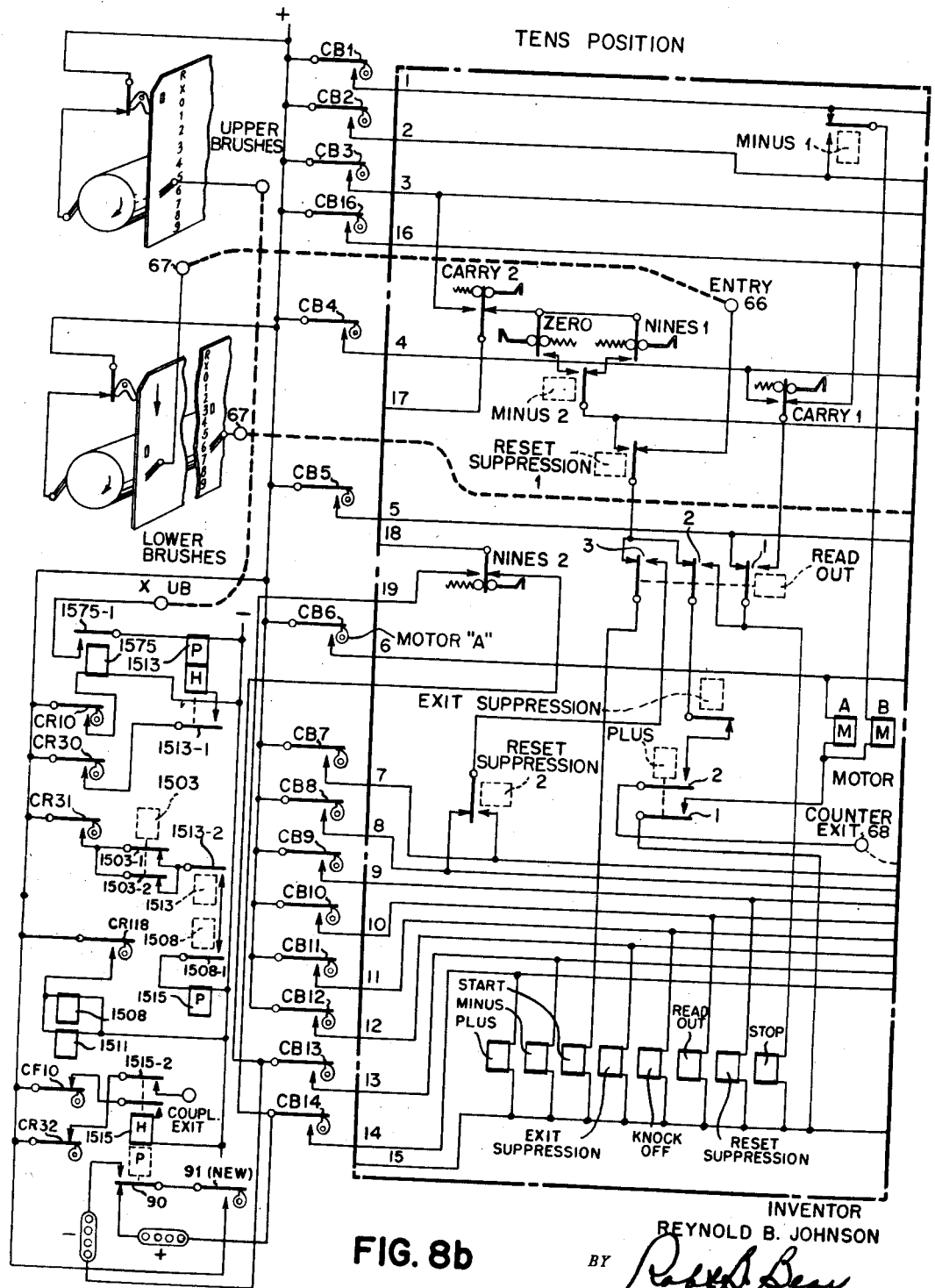

Figs. 8a and 8b taken together represent a typical circuit diagram for the a tens and a units orders accumulating device in bank.

Figure 9:
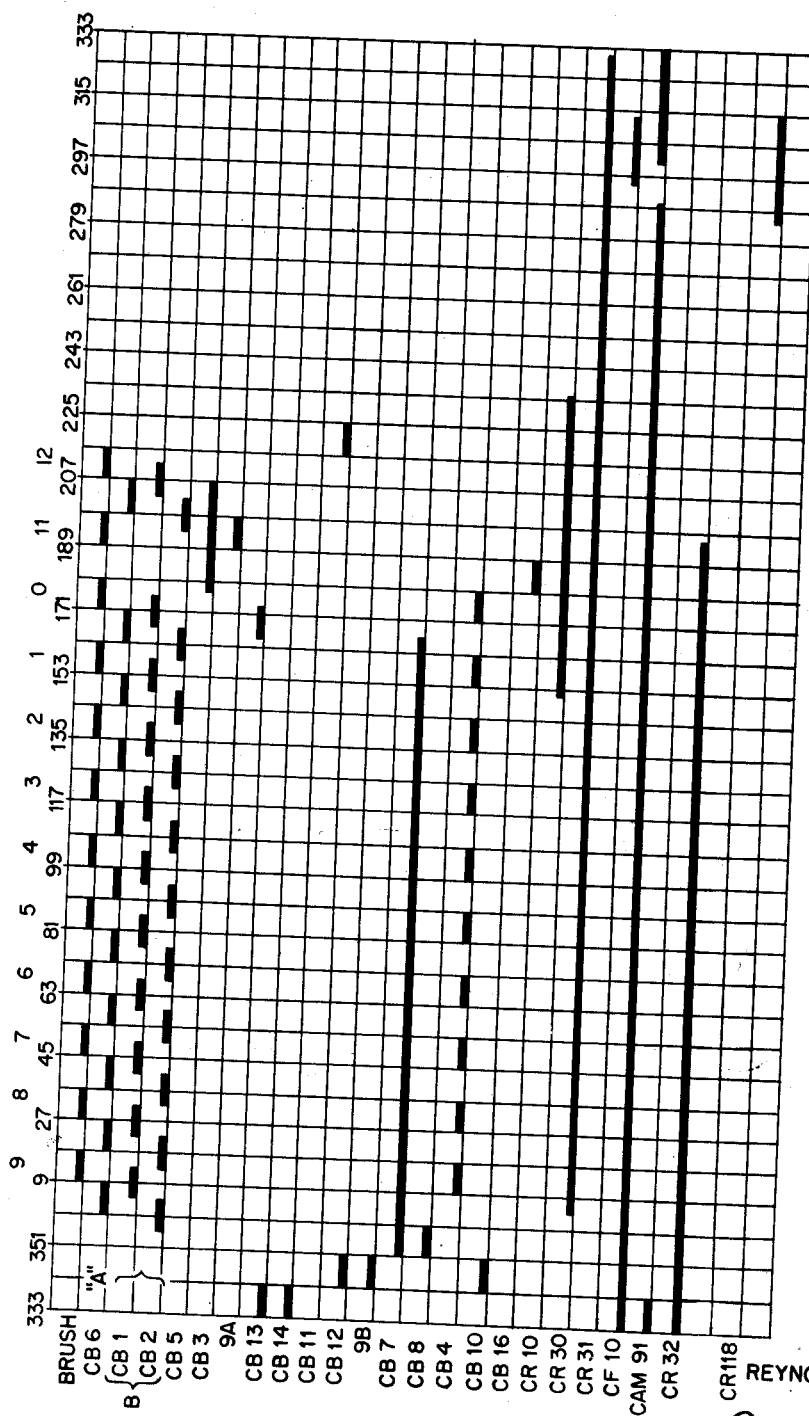

Fig. 9 is a typical time diagram showing the sequence of electrical impulses associated with the operation of the accumulator during a machine cycle.

GENERAL DESCRIPTION

Figure 1:
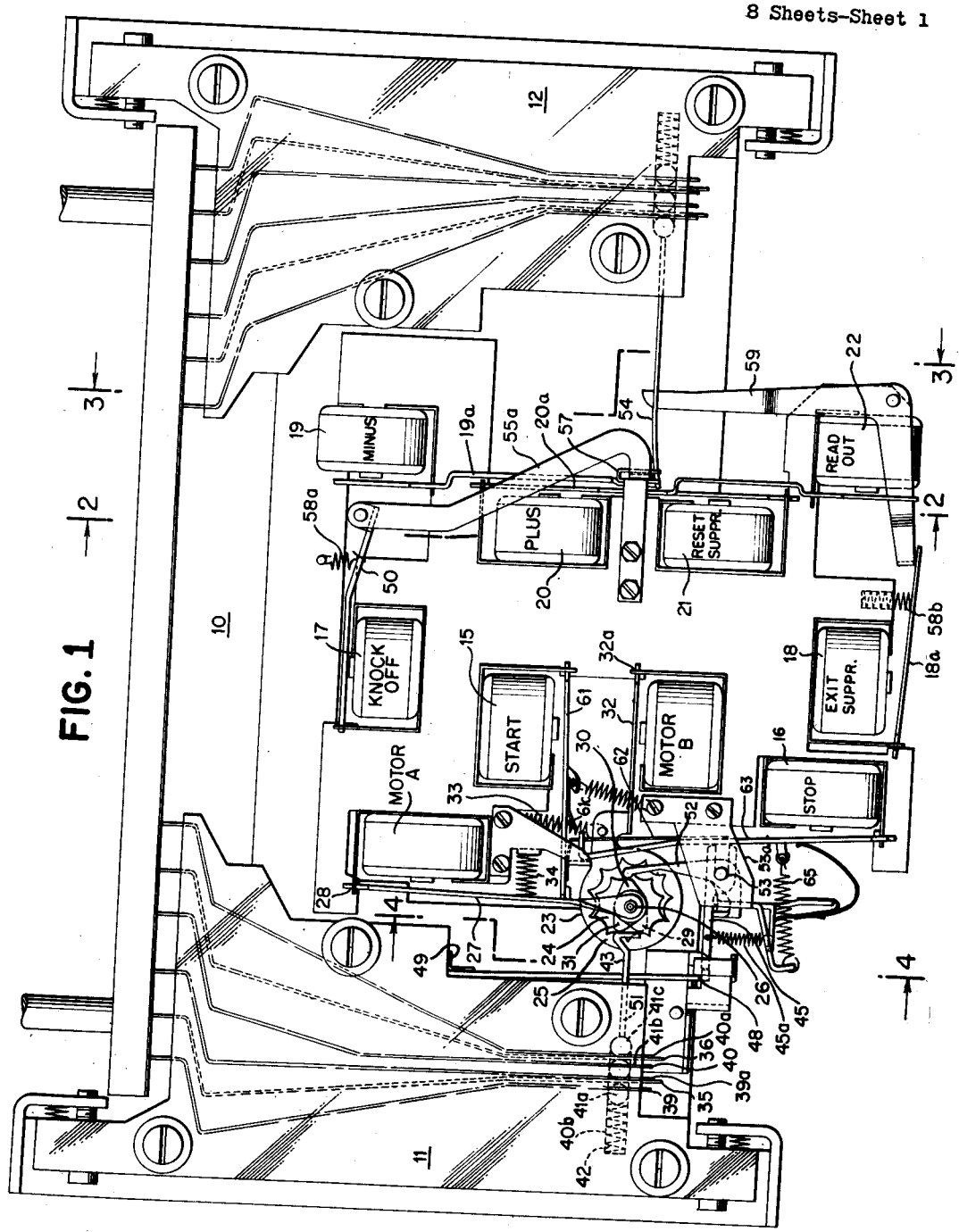
Fig. 1 is a front view of one embodiment of such an accumulating device completely assembled.

Referring to Fig. 1, the base plate 10 of the accumulator generally configured as shown, provides a mounting structure for two wire contact units generally designated as 11 and 12; a plurality of pole pieces surrounded by coils thus forming electromagnets, namely, Motor A, Motor B, Start 15, Stop 16, Knock off 17, Exit Suppression 18, Minus 19, Plus 20, Reset Suppression 21, and Readout 22; and also for a unique counter operating mechanism generally designated 23.

The counter operating mechanism 23 accumulates digital data. In conjunction with it the wire contact device 11 cooperates through a system of slides with the nine, zero, and carry lobes or cams in the counter operating unit to perform the carry operation in addition or subtraction. The other wire contact unit 12, also a part of the accumulator control, is adapted under the influence of the various magnets and their depending armatures mounted in the device to perform other varied selective functions, such as add conditioning, subtract conditioning, readout, exit suppression, knock-off, and so on.

Counter operating mechanism

The counter operating mechanism 23 comprises a driven gear 24 and a driving gear 25. The driven gear 24 has ten external teeth, one tooth for each digit in the decimal system. As illustrated in Figs. 1 and 7a–7d, the grooves between the teeth in the driven gear 24 are circular arcs. The driven gear is mounted on a freely rotatable axial shaft 26. This shaft is rotatably mounted on the armature 27 of Motor A. The armature of Motor A pivots about the point 28. Three cams to be described later are provided on the shaft 26 of the driven gear 24 and rotate with the shaft. One cam 29 designated the zero cam, another cam 30, the carry cam, and the third cam 31, the nine cam.

Figure 7C:
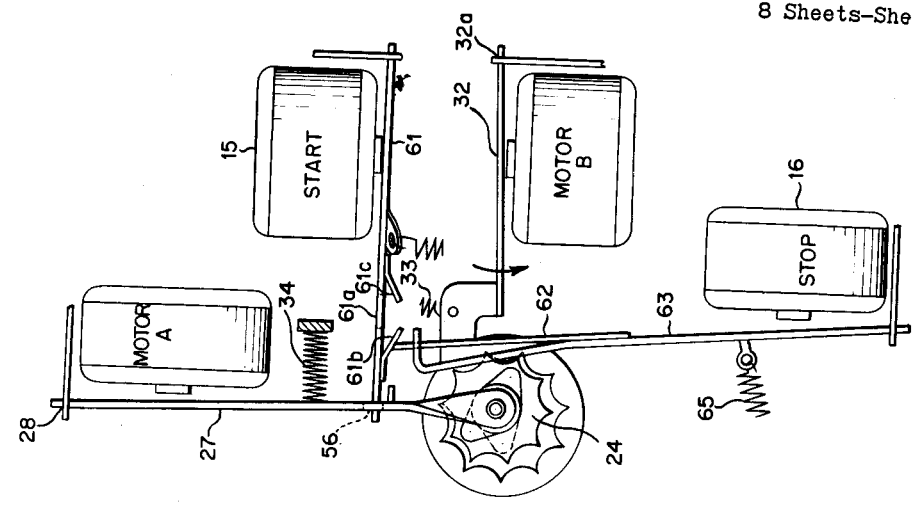
Figs. 7a, 7b, 7c, 7d and 7e are diagrammatic representations of the cooperating accumulator gears and their associated magnets showing an example of the animation of the gears advancing one cycle in an adding operation.
Figure 7B:
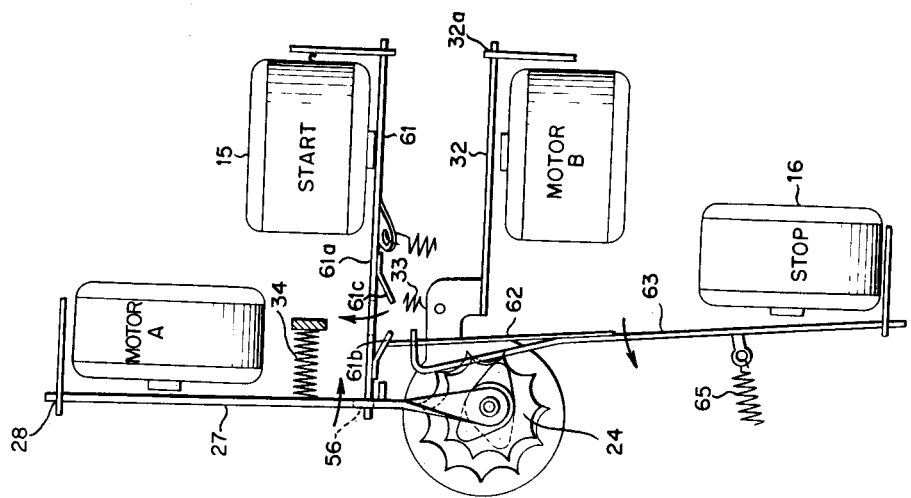
Figure 7A:
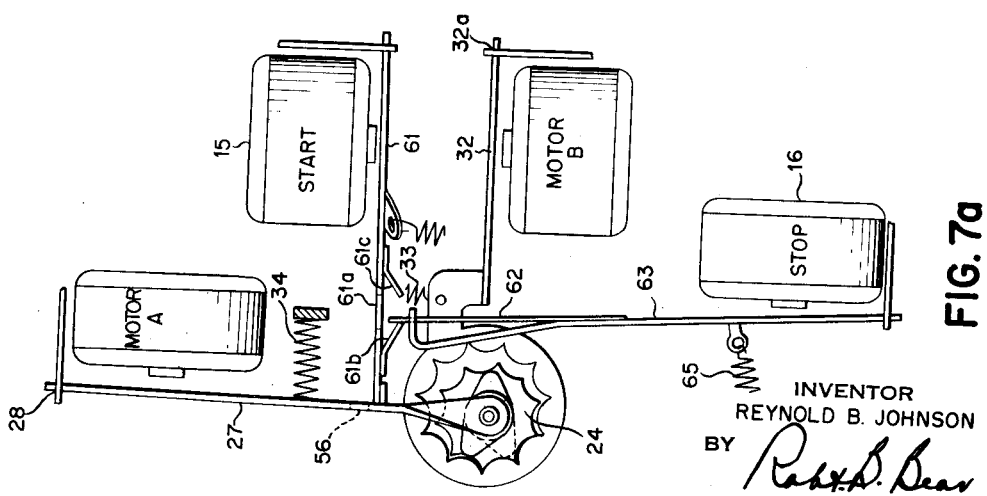
Figure 7E:
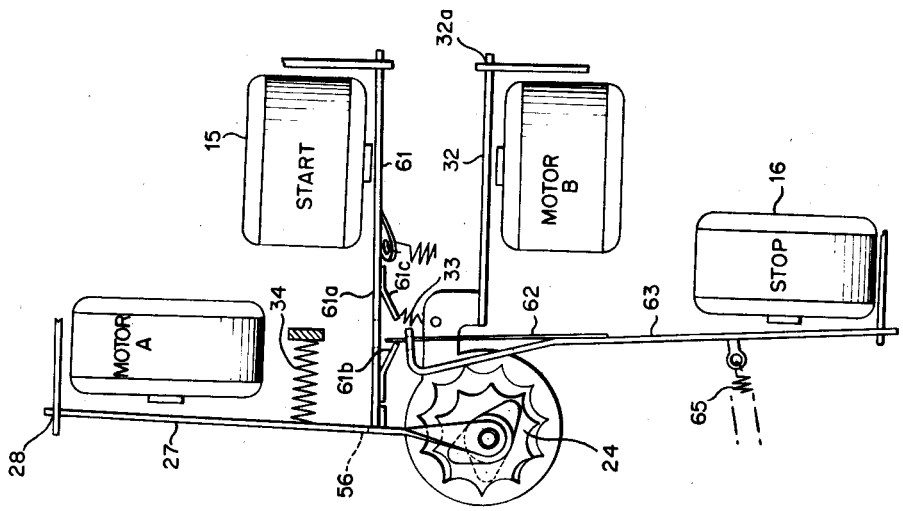

The driving gear 25 having eleven internal teeth cooperates with the driven gear 24 in the manner shown in Figs. 7a–7e. The teeth or lands of the driving gear 25 are circular arcs, while grooves in the intervals between adjacent circular arcs are provided to mesh with the teeth of the driven gear 24. The driving gear 25 forms an integral part of the armature 32 associated with Motor B, and it is pivotable about a point 32a. The armatures 32 and 27 are disposed substantially at right angles to one another. The axis of rotation of the driven gear 24 is slightly off center in the normal or unexcited position with respect to the geometric center of the driving gear 25 as shown in Fig. 7a.

For an understanding of how the rotation of the driven gear 24 is effected, the sequence of operations for a one station clockwise advance will first be described. Figs. 7a–7e show a single additive operation in six steps. This advance of the driven gear one unit clockwise is achieved in response to a pair of successive oscillating movements of the armatures 27 and 32. An electrical pulse excites Motor A causing the armature 27 bearing the driven gear 24 to swing counterclockwise about its pivot 28 (Figs. 7a and 7b). With this movement the driven member 24 is correspondingly swung through an arc in a clockwise direction with some of its external teeth meshed in the internal teeth of the driving gear 25. In this situation (Fig. 7b) the driving gear may be compared to a horizontal rack over which a pinion (the driven gear) is rolled. At this time the driving gear 25 is biased by the spring 33 to mesh with the driven gear 24.

The driven gear 24 has now been displaced one-quarter unit clockwise with the electrical pulse to Motor A still effective, and completes the first oscillation in the sequence of pivoting movements necessary to cause a step-by-step advance of gear 24. Referring now to Fig. 7c, the second oscillation cycle begins as another electrical pulse energizes Motor B. The driving gear 25 and its integral armature 32 are swung about pivot 32a in a counterclockwise direction. Since the cooperating gears are biased by the magnetic attraction of Motors A and B to their respective armatures, the driven gear 24 is again rotated in a clockwise direction because of the relative movement between the gears where some of the teeth are meshed. Here again the action may be compared to the rack and pinion movement; only now different teeth in the mating gears are enmeshed. The rack and pinion may be assumed to be vertically disposed, figuratively speaking, with the rack (driving gear) moving downwardly thereby rotating the pinion (driven gear) clockwise about its axis of rotation.

Figure 7D:
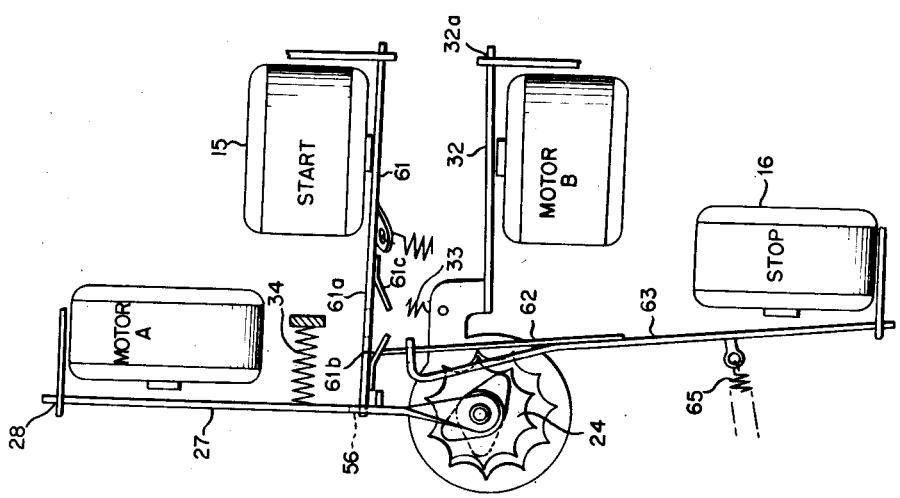

With the pulse to Motor B still effective, Motor A is de-energized (see Fig. 7d). The driven gear 24 and its armature 27 are returned to the home position biased by spring 34, and this movement swings the Motor A armature 27 clockwise about its pivot 28. Again using the rack and pinion example, the rack (driven gear) remains stationary and horizontally disposed above the pinion (driving gear) which is now rolled to the left against the rack. The driven gear 24 has now been advanced about three-quarters of a unit clockwise. The pulse to Motor B terminates just before arriving at the condition shown in Fig. 7d, allowing tensioned spring 33 to bring the driving gear 25 and its armature to the home position (Fig. 7c). This action causes the driven gear 24 to again be displaced clockwise, finally completing a one increment advance. Thus, by successively pulsing Motor A and Motor B and then successively deenergizing Motor A and Motor B, respectively, the driven gear 24 is turned one-tenth of a revolution, representing one unit advance clockwise.

In a similar manner the driven gear 24 may be rotated one-tenth of a revolution or one station counterclockwise for subtractive operations. The only difference in the operation from that described for addition in Figs. 7a through 7c is that the order of pulsing the motors is now reversed. Similarly, de-energization of the motors is reversed. In other words, Motor B is first excited, then Motor A; Motor B is next de-energized and then Motor A. By applying the principle of the rack and pinion, it will be seen that this sequence of events in a subtractive operation will cause one station counterclockwise rotation of the driven gear. This is the principle of the counter-operating mechanism.

Controlling means

Considering now the controlling means for conditioning the accumulator to make it operative, the wire contact devices generally designated as 11 and 12 in Fig. 1 and shown in more detail in Figs. 2, 3, 5, and 6, shall be described. All of the wire contact units banked in these devices are similar in construction, and a description applying to any one unit applies generally as well to the others. A wire contact unit forming a component of a wire contact device is mounted in a laminated block of insulating material having the configuration shown in Figs. 1 and 5. A pair of flexible contact wires are confined in separate grooves within the insulating block and terminate in pairs as indicated at 35 and 36. Separate grooves in the block are provided to receive and insulate rigid U-shaped contact wires looped at their exposed terminals, as for example, 39, 39a, and 40, 40a. One looped terminal is opposed cooperatively on each side of each pair of the flexible wire terminals in the unit, as for example, wires 35 cooperate with terminals 39 and 39a. Alignment of the grooves and their associated wires is such that each pair of flexible wire contacts is associated with a pair of looped non-flexible wire terminals. This provides a selective switching or transfer arrangement. The upper ends (Fig. 5) of each of the flexible contact wires and the looped terminals are externally wired in a manner to be described in connection with the circuit diagrams to complete certain circuits for controlling the functions of the accumulator.

The flexible pair of contact wires (e. g. 35) thus normally make contact with one of the looped terminals (e. g. 39a) and in the operative position are transferred from this position to make contact with the other looped terminal (e. g. 39). The means provided for making this transfer of center contact wires is shown in detail in Figs. 5 and 6. Within the hollow space 40b of the wire contact housing, three insulating cylinders or rollers 41a, 41b, and 41c are provided. These cylinders fit snugly within the hollow groove 40b and are free to roll to the right or left within the confined space between the upper and lower surfaces of the groove. The pairs of flexible wire contacts, such as 35 and 36, pass between the nips of the rollers 41a, 41b, and 41c. The compressed spring 42 urges the train of rollers toward the right, and the rollers in turn normally press the flexible contact wires 35 and 36 against the looped terminals 39a and 40a respectively corresponding to their inoperative position. Communicating with the right roller is the end of a J-shaped slide 43 that extends through a slot in the wire contact housing with its opposite end disposed in a position for cooperation with the nine cam 31. Similarly, the J-shaped slide 44 is actuated by the zero cam 29. Both of these cams are on the rotatable shaft 26 of the driven gear 24. As the high of the nine or zero cam passes its associated J slide, the slide is driven to the left against the tension of the spring 42, causing the rollers 41a, 41b, and 41c to shift to the left, thereby transferring the flexible contact wires (e. g. 35) from their inoperative to the operative position to close the normally open contact with the associated looped terminals (e. g. 39) to the left.

The transfer of the contact wires for controlling the carry operation is controlled in the following manner: Referring to Fig. 1, there is shown a block 45 pivotable out of the home position shown about the stud 53 under the influence of the armature 63 of the stop magnet 16. This block 45 pivots with the stop armature and is disposed to cooperate at its left end with a spring blade 48. The spring blade 48 in turn is in contact with a resilient L-shaped member 49 that is anchored to the housing of the unit. A short slide 51 (see Fig. 6) cooperates with the blade 48 and the member 49 and the train of rollers through roller 41c. Thus, when the stop magnet armature 46 is biased away from the top magnet coil on de-energization of that magnet 16, the movement is transmitted by means of resilient member 49, spring blade 48, and the slide 51 to cause the rollers 41a, 41b, and 41c to shift the carry contact wires to the inoperative position. To shift the carry contact wires to the operative position at carry time, there is provided a bell crank 52 pivoted at 53 on a bracket 53a secured to the fixed core structure of the counter. The bell crank 52 is actuated by the high of the carry cam 30 which engages the arm of the bell crank 52 to unlatch the blade 48 from the block 45. The block 45 is restored to the home position under the bias of spring 45a.

The bank of three wire contact units, comprising the wire contact device, generally designated 11, at the left side of the accumulator shown in Fig. 1, thus controls the nine, zero, and carry operation of the accumulator. The bank of six wire contact units comprising the wire contact device 12 on the right side of the accumulator shown in Fig. 1 provides controls with two contact units for readout and one contact unit each for the plus, minus, reset suppression, and exit suppression operations. The six wire contact units to the right are all somewhat similar in operation. Associated with the plug magnet 20 and its depending armature 20a is a cooperating spring slide 54 disposed to shift the plus contact wires in the wire contact unit to the operative position and a restoring bail 55 to return these wires to the non-operative position. In the operation of these members the restoring bail 55a is first moved to a non-interfering position. When the plus magnet 20 is energized, its armature 20a disengages itself from the spring slide 54 which accordingly assumes an interfering position with respect to the movement of the armature 20a. When the plus magnet 20 is deenergized, its armature 20a engages the slide 54 to cause it to move and impart such movement to the flexible contact wires of the unit through the rollers corresponding to rollers 41a, 41b, and 41c. To restore the wire contacts to their inoperative position, the restoring bail 55a is operated to disengage the slide 54 from the armature 20a, whereupon the compression spring 42 becomes effective to shift the wire contacts back to normal. At the beginning of the next machine cycle, the restoring bail 55a is moved into a non-interfering position with respect to the operating members.

The depending armatures of the minus 19, plus 20, reset suppression 21, and readout 22 magnets are configured so that each presents a portion of its surface for cooperation with an associated spring slide similar to 54. This slide in turn operates a particular wire contact unit in the manner described. The minus and plus armatures furthermore are so disposed that movement of the minus armature 19a to its energized position causes the plus armature 20a to also shift. The comb-like guide 57 serves as a back-stop for the armatures and a guide for each spring slide 54. Freely attached and cooperating with the armature 50 of the knock-off magnet 17 is a restoring bail 55a adapted to positively restore the spring slide 54 at the end of each machine cycle. At the beginning of each machine cycle the knock-off bail 55a is restored by a spring 58a. The exit suppression wire contact unit is controlled in a similar manner by the exit suppression magnet 18 through its depending armature 18a, bell crank 59, and spring slide 54.

To prepare the driven gear 24 for operation (see Figs. 7a–7d), the armature 27 of Motor A has an opening 56 adapted to cooperate with the armature 61 of the start magnet. The armature 61 of the start magnet 15 in turn has an opening 61a adapted to cooperate with a spring blade 62 secured to the armature 63 of the stop magnet 16. Also attached to the start magnet armature are a pair of projecting blades 61b and 61c. The spring blade 62 attached to the stop magnet armature normally extends between the projecting blades 61b and 61c into the opening 61a in the start magnet armature and is biased by spring 65 against the left side of that opening (Fig. 7a). Now when the start magnet is energized (Fig. 7b), its armature 61 is brought into a non-interfering position with respect to the armature 27 of Motor A, since in pivoting, the end of the start magnet armature 61 is brought into the opening 56 in the armature of Motor A. The armature of Motor A may now respond in accordance with the pulsing of Motor A.

Furthermore, the start magnet armature 61 once having reached an energized position is held latched in that position by spring 62. During addition or subtraction without carry, this is accomplished in the following manner: As the start magnet armature 61 pivots (Fig. 7b) to its energized position, the spring blade 62 attached to the stop magnet armature 63 disengages itself from its flexed position behind the projection 61b on the start magnet armature 61 and snaps under that projection 61b holding the start magnet armature 61 in a non-interfering position relative to the Motor A armature. Subsequent pulsing of Motors A and B accordingly causes rotation of the driven gear 24 in the manner already described. Rotation of the driven gear continues until such time as the stop magnet 16 is energized. When this happens, the blade 62 on the stop magnet armature is shifted to the right, unlatching the start magnet armature to allow it to interfere with the Motor A armature. With this interference, pulses to Motor A or Motor B no longer cause rotation of the driven gear 24. As long as the stop magnet is energized, blade 62 is biased against the projection 61c. This is the state of the mechanism when the carry operation begins.

At the beginning of the carry part of the cycle, another pulse energizes the start magnet again, thereby enabling the operation of the Motor A armature without interference. The spring blade 62 is thus allowed to disengage itself from the projection 61c, and this time it snaps underneath the projection 61c to maintain the start armature latched in the energized position until the stop magnet is again deenergized. When this happens, the biasing spring 65 pivots the stop magnet armature and swings the spring blade 62 into a position between the projections and through the opening 61a in the start magnet armature in the position shown in Fig. 7a.

*Circuits*

Referring to Figs. 8a and 8b taken together, a typical electrical circuit for operably conditioning the present invention will be described. A timing diagram (Fig. 9) will also be considered to show how the correct impulses are directed at the right time to the proper element. Fig. 8a represents the circuit for the units accumulator, and it is interconnected as indicated with Fig. 8b representing the tens accumulator wiring. The wiring for the higher denominational orders is similar in every respect to the units and tens position wiring and each position accumulator is electrically inserted in bank as the tens position is connected with the units position.

*Adding from the brush impulse*

The counter entry hub 66 of each denominational order accumulator is interconnected through the conventional plugboard with its respective hub 67 of the lower sensing brushes of a well known IBM electrical accounting machine. The counter exit hub 68 is plugged to the type bar entry hub which in turn is connected with the conventional print magnet 69.

The upper sensing brushes are interconnected with the positive side of the accumulator circuit through a pilot selector and co-selector which are commonly used in electric accounting machines. The upper brushes, by sensing the presence or absence of a particular hole in a record, for example, an "X" hole, determine if the next card to be sensed by the lower brushes is a credit or debit entry. The circuit is then conditioned accordingly by the pilot selector and co-selector to receive that value and to impart step-by-step motion to the driven gear in the proper direction.

For example, an "X" hole in the record card sensed by the upper brushes will cause the pilot selector and co-selector relay to be energized (transferred) for the cycle that the "X" punched card is being sensed by the lower brushes. The circuit is as follows: The pilot selector "X" hub is conditioned by relay 1575 so that it will only accept impulses timed between 150° and 245°. An impulse from the upper brushes to the "X" hub will cause the pilot selector relay to be energized at 295° of the same cycle. The pilot selector relay will remain energized until 286° of the next cycle. At 157° of the machine cycle of the card passing the upper reading station, an "X" impulse sensed by the upper brushes passes through the "X" hub, through 1575–1, through pickup coil of relay 1513 to the negative side of the circuit of the pilot selector. A hold circuit is established for relay 1513 until 330° by a pulse from CR30 passing through 1513-1 to the hold relay 1513H. Energizing relay 1513 causes relay 1515 to pick up by the following circuit: CR31 pulses at 295° through normally-closed 1503-1, through normally-closed 1503-2, through normally-open contact 1513-2, through normally-open contact 1508-1, to relay 1515 pickup coil to the negative side of the line. Relays 1508 and 1511 are energized each machine cycle through CR118 (285° to 315°), through relays 1508 and 1511 in parallel to the negative side of the line. A hold circuit for hold relay 1515 is established through normally open contact 1515-2 at 303° through 289° of the next machine cycle.

Energizing relay 1515 transfers contact 90 and causes a pulse through cam 91 at 333° through the negative hub of the co-selector. This pulse is picked up to condition the circuit for negative accumulation.

If no "X" hole is detected in the record, the pulse from cam 91 at 333° goes to the plus hub of the co-selector to condition the circuit to add the next value sensed from the record by the lower brushes. Hence at 333°, a short pulse is received through CB14 over line No. 14 energizing the plus coil 20 closing the two plus contacts and latching them closed as previously described. Motor A then starts receiving pulses from circuit breaker No. 6 over line No. 6 through the normally-open plus contacts which have been closed, and Motor B starts getting alternately and successively pulsed with respect to Motor A by circuit breaker No. 1 through the normally-closed minus contacts. These pulses to Motors A and B go to the opposite side of the circuit by line No. 15. The armature 27 of Motor A, however, is prevented from moving until the start magnet 15 is energized and its armature 61 is moved out of the interfering position as already explained. At the hole in the card, a 5 (or 81° of the machine cycle) in this case, a signal is received from the lower sensing brushes 67 over the plugged wire through the counter entry hub 66, through the normally-closed reset suppression contacts, then through the normally-closed read out contact No. 3 to the start magnet and finally to the opposite side of the circuit by line No. 15. Thus, at 5 time or 81° the start magnet is energized; its armature is no longer in interference with the functioning of Motor A, and the start armature 61 is latched by the stop armature blade 62 in this position. Motors A and B will receive five additional impulses after the start armature is energized, and the driven gear will be rotated five increments or 5/10 of a revolution at which time (175° of the machine cycle) the stop magnet 16 receives a pulse from circuit breaker No. 5 to unlatch and restore the start armature 61 to its deenergized or interfering position with respect to armature 27 of Motor A.

This pulse originates at circuit breaker No. 5, passes through the normally closed readout contacts Nos. 1 and 2 to the stop magnet 16 and then to line No. 15.

The same pulse from the 5 hole in the card is also directed out of the counter exit hub 68 through the plug wire to the print magnets 69 to cause counter listing. This is done by splitting the pulse from the lower brushes after it has passed the counter entry 66 through the normally-closed reset suppression contact No. 1 from the pulse going to the start magnet. The printing portion of the split pulse then passes to the normally-closed readout contact No. 3, through normally-closed readout contact No. 2, through the normally-closed exit suppression contact, through the normally-open plus contact No. 2, and out of the counter exit hub 68, to the print magnet 69.

At the end of the add cycle the knock-off magnet 17 receives a pulse directly from the circuit breaker 11, thereby restoring the plus contacts to their normal position.

The carry operation while adding from a brush impulse occurs during the cycle if the carry cam 30 on the driven gear of any accumulator in the bank passes from "9" to "0." When this occurs, carry contacts Nos. 1 and 2 in that denominational order accumulator are mechanically transferred. The transfer of carry contacts Nos. 1 and 2 results in a signal to carry an additional "one" into the next higher order accumulator. The introduction of the carry unit is initiated by circuit breaker No. 3 at 189° or eleven times in the machine cycle. This test pulse is fed to the carry contacts No. 2 of all accumulators in the bank, and if that contact has been mechanically closed by the carry cam 30, the pulse is directed through it along line 17 to the start magnet 15 of the next higher accumulator by way of the C-1 hub, the normally-open reset suppression contact No. 1 and the normally-closed readout contact No. 3. The reset suppression contact No. 1 has been previously transferred at 160° in the cycle by the pulse passing along line No. 9a directly to the reset suppression magnet. The reset suppression contacts Nos. 1 and 2 remain latched up until the knock-off magnet 17 receives a pulse.

With the start magnet 15 thus energized, the start armature 61 latches under the projection of the armature of the energized stop magnet out of the interfering position with respect to Motor A. At 198° Motor A receives a pulse, and at 203° Motor B is pulsed; Motor A is then deenergized at 207°, and Motor B is next deenergized at 212°. A "one" is hence added to the next higher order accumulator provided the start magnet has been energized in the carry operation just described.

For example, if the unit position accumulator passes from "9" to "0," the 189° or carry pulse from circuit breaker 3 passes through the normally-open carry contact No. 2 of the units position to bus No. 17 and then to the tens position C-1 hub where the pulse is split. The pulse is then impressed through transferred normally-open reset suppression contact No. 1 of the tens position, passes through the normally-closed readout contact No. 3, then to the tens position start magnet, and finally to line No. 15. The start armature of the tens position accumulator thus latches out of the way of Motor A of the energized stop armature. Commencing at 198°, Motors A and B will then advance the tens position accumulator in the positive direction one increment. After the carry operation, the stop magnet is deenergized, allowing the stop armature to return to normal, and this also restores the carry contact to a normal position.

The carry-on-carry operation is provided for in the following way: If an accumulator receiving a carry signal is also standing on the "9" position, then this same carry signal is passed on through that position's "9's" contact to the next higher order accumulator. The operation is as follows: The carry pulse originated by circuit breaker No. 3 that reaches the C-1 hub of the position accumulator also standing on nine in addition to energizing the start magnet of that accumulator is split at the C-1 hub and passes through the normally-closed minus contact No. 2, through the transferred normally-open "9's" contact, through the normally-closed carry contact No. 2, along line No. 17 to the C-1 hub of the next higher order accumulator through the normally-open reset suppression contact No. 1 of that accumulator, through its normally-closed readout contact No. 3 to its start magnet, and finally to line No. 15. The one unit driving or carry operation commenced at 198° by Motors A and B will be effective in all accumulators in the bank having their start magnets thus energized.

*Subtracting from the brush impulse*

The accumulator can be conditioned for subtraction with all the circuit functions identical to those for adding but for the following exceptions:

At 333° in the machine cycle an X punch having been sensed by the upper brushes, the pilot selector and co-selector cause the minus magnet to receive a direct pulse from circuit breaker No. 13 instead of the plus magnet being pulsed as in the adding operation. The minus armature being attracted also mechanically biases the plus armature to close the two plus contacts. Circuit breaker No. 2 now pulses Motor B in advance of the pulses going to Motor A from circuit breaker No. 6. The pulse originating at circuit breaker No. 2 goes through the normally-open minus contact No. 1 to Motor B, then through the normally-open plus contact No. 1 to line No. 15. As already explained, the reversal of order of the first of a series of alternately successive pulses to Motor A and to Motor B causes rotation of the driven gear in the reverse direction.

A conventional reverse subtraction method of operation may be followed with this type of accumulator. The value standing in the accumulator at the end of a subtraction cycle is the "9's" complement of the resultant value or the difference of the subtraction operation. The true numerical difference of the subtraction calculation is, however, printed by the type bars in this case by well known methods. That is, the type bars begin their upward movement at 9 time in the machine cycle and are arrested in their upward travel by the type magnets when a hole in the card is sensed by the lower brushes. The type bars hence print the "9's" complement of the value standing in the accumulator which "9's" complement is the true difference of the subtraction operation. An example of reverse subtraction is as follows:

Accumulator reading to begin with add_____ 0000
(1) Value derived from a card_____ 25
  Value standing at end of (1) add cycle_____ 0025
(2) Value derived from next card add_____ 81
  Accumulator standing at the end of (2) add cycle but before carry_____ 0006
  Carry _____ 0100
  Value standing at end of carry_____ 0106
(3) Value derived from next card subtract_____ 152
  Accumulator standing at the end of (3) subtract cycle but before carry_____ 0054
  Carry _____ 1101
  Value standing after carry_____ 9953
(4) Value derived from next card—subtract_____ 28
  Accumulator standing at end of (4) subtract cycle but before carry_____ 9935
  Carry _____ 0010
  Value standing after carry_____ 9925

It can be seen from the example above that the carry operation in subtraction occurs when the cams on the driven gear pass from "0" to "9" instead of from "9" to "0" as in adding. The minus contact No. 2 is used to shift the carry signal arrangement from the "9's" to "0" contact during subtraction. It also follows that the carry-on-carry operation occurs when an accumulator receives a carry signal from a lower denominational accumulator, the receiving accumulator standing on "0." When this happens, the receiving accumulator transfers a carry signal to the next higher order accumulator. The operation is similar to the carry through "9" that occurs during adding. The carry signals subtract one unit during a subtract cycle rather than adding a unit as in the add cycle.

The "elusive one" is handled by the well known method of plug wiring the "C" hub of the unit's accumulator to the "C–1" hub of the highest denominational order accumulator in the bank. Any carry pulse, then, from the highest order accumulator is directed back into the unit's position accumulator.

*Readout with reset*

Assuming a positive total of "6" is standing in the accumulator at the beginning of the readout cycle, the reading out and the resetting of the accumulator to a home position occurs in the next machine cycle as follows: The plus magnet is pulsed directly from circuit breaker No. 14 at 333°, and the plus contacts Nos. 1 and 2 latch closed. At 342° a direct pulse from circuit breaker No. 10 to the readout magnet transfers readout contacts Nos. 1, 2, and 3. The start magnet is energized, and its armature is latched in the energized position by the blade of the stop armature at 351°. This happens when circuit breaker No. 8 sends a pulse through the normally-closed reset suppression contact No. 2, through the normally-open readout contact No. 3 to the start magnet and then to line No. 15. Motor A will then start receiving direct pulses from circuit breaker No. 6, that pulse then going through normally-open plus contact No. 1 to line No. 15. Then Motor B will also start receiving pulses through circuit breaker No. 1 through normally-closed minus contact No. 1. After passing through Motor B, this pulse passes through normally-open plus contact No. 1 to line No. 15.

The driven gear then starts a step-by-step rotation in a positive direction and will have rotated through four increments when the carry contacts are caused to transfer as the gear passes from "9" to "0." At 63° a pulse from circuit breaker No. 4 is directed to the stop magnet, thereby unlatching the stop armature and preventing movement of the driven gear even though Motors A and B continue to receive pulses. The circuit of this pulse from circuit breaker No. 4 is through the normally-open carry contact No. 1, through the normally-open readout contact No. 1, to the stop magnet and finally to line No. 15. This same pulse is also directed out of the counter exit hub to arrest the type bar at the 6 printing position. This pulse to the print magnet hub follows a circuit from circuit breaker No. 4 through normally-open carry contact No. 1, through normally-open readout contact No. 2, through the normally-closed exit suppression contact, through normally-open plus contact No. 2, and out of the counter exit hub to the print magnet. At 72°, when this impulse through the carry contact No. 1 is broken, the stop magnet armature returns to its deenergized position, relatching the carry contact and thereby preventing further pulses from being emitted at the counter exit hub. The accumulator in the example will be standing at zero at the end of the reset cycle.

When resetting an accumulator with a positive or debit value standing in it, the driven gear will always reset or stop at the "0" position. If a negative or credit value is standing in the accumulator when clearing, a similar series of events occurs as in clearing a positive total, but the driven gear is reset to "9." This makes no difference in the results achieved in the operation of the accumulator. By way of example, it is shown below that the accumulator adds and subtracts identically regardless of its starting position being "9" or "0."

(1) Accumulator reset to_____ 0000
  Add _____ 0001
  Accumulator standing at end of (1) add cycle but before carry_____ 0001
  Carry _____ 0000
  Accumulator standing after carry_____ 0001
(2) Accumulator reset to_____ 9999
  Add _____ 0001
  Accumulator standing at end of (2) add cycle but before carry_____ 9990
  Carry _____ 1111
  Accumulator standing after carry_____ 0001
(3) Accumulator reset to_____ 0000
  Subtract _____ 1
  Accumulator standing at end of (3) subtract cycle but before carry_____ 0009
  Carry _____ 1111
  Accumulator standing after carry_____ 1
(4) Accumulator at end of (4) subtract cycle but before carry_____ 9998
  Carry _____ 0000
  Accumulator standing after carry_____ 9998

By way of illustration to show the readout and reset cycle of operation when clearing a negative or credit total, assume that the accumulator is standing at a credit "6." A test pulse is applied over line No. 18 to the "9's" contact of the high order accumulator to detect the presence of a credit total. With a credit total present, as evidenced by the high order accumulator standing on "9," this signal will cause the minus magnet to be energized rather than the plus magnet as before. The energizing pulse to the minus magnet passes directly from circuit breaker No. 13 to the minus magnet and then to line No. 15. The driven gear will now rotate in the negative direction since Motor B is now pulsed by circuit breaker No. 2. The carry contact is now transferred as the driven gear passes from "0" to "9," as already explained in the subtract cycle. Since the accumulator stood at a value of negative 3, at 117° or three times, which is the "9's" complement of 6, the pulse from line No. 4 will pass through the transferred carry contact No. 1 to stop the driven gear at "9," as well as to energize the print magnet to print a "3."

Readout without resetting

To read out information from an accumulator without resetting or clearing it, the same series of events occurs as any normal readout with resetting, but for one exception. In the case of readout with reset, the start magnet received a short pulse at 351°, and its armature was latched in the energized position by the blade on the stop magnet armature. When totaling without resetting, however, the start magnet is held energized during the entire ten cycle points of rotation of the driven gear, and it is not under the control of the stop magnet during this time. Because the start magnet is never deenergized during the readout cycle, the driven gear rotates ten increments and thereby returns to its original starting position, with the same values standing in it as in the beginning of the cycle.

To condition the accumulator for readout without resetting, the circuit breaker 9b pulses the reset suppression magnet at 342° in the previous machine cycle. Then at 351° circuit breaker No. 7 begins a long pulse through the normally-open reset suppression contact No. 2, through the normally open readout contact No. 3 to the start magnet, and then to line No. 15. This pulse continues to 164° or through the entire ten cycle points of rotation of the driven gear. After completing the ten cycle points, the start magnet is again deenergized, and the stop magnet is pulsed at 180° by circuit breaker No. 16 through normally-closed carry contact No. 1, through normally-open readout contact No. 1, to the stop magnet and then to line No. 15.

Exit suppression

Whenever it is desired to suppress impulses which would normally be emitted through the counter exit hub of the accumulator, an exit suppression magnet and contact is provided which, when energized, opens the counter exit circuit. The exit suppression magnet is pulsed directly by circuit breaker No. 12. Among the uses of the exit suppression function are the suppression of the accumulator list signal during the accumulator cycle, the suppression of the total impulses which are normally emitted during a total cycle for accumulator reset without printing, and selective accumulator list controlling.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an accumulator, a counting mechanism including in combination a pair of pivotable gears, one of said gears rotatable and having peripheral teeth, the other of said gears having internally cut teeth and located for cooperation with said rotatable gear, pivoting means, said rotatable gear responsive by step-by-step advance or retrogression to register positive or negative quantities by alternately successively pivoting said gears.

2. In an electro-mechanical accumulator, a totalizing mechanism comprising in combination a pivotable rotatable gear having peripheral teeth and a pivotable gear having externally cut teeth in cooperation, means for pivoting said gears whereby the rotatable gear advances or retrogresses one station depending on the relative sequence of alternately successively pivoting each of said gears away from a home position and then in the same sequence alternately successively pivoting said gears back to a home position.

3. In an electro-mechanical accumulator, a totalizing mechanism comprising in combination a pair of cooperating gears, each of said gears mounted to pivot through an arc, one of said gears rotatable and having external lands and grooves, the other of said gears having internal lands and grooves the number of which exceed by one the number of lands and grooves in said rotatable gear, means for pivoting said gears, said rotatable gear responsive to alternate successive pivoting of said gears away from a home position and then in the same sequence alternate successive pivoting of said gears back to a home position to cause a one station advance or retrogression of said rotatable gear.

4. An electro-mechanical accumulator as described in claim 3 having a plurality of said totalizers wherein said each of said rotatable gears is provided with means for controlling the carry operation.

5. In an electro-mechanical accumulator, a totalizing mechanism comprising in combination a pair of cooperating gears, each of said gears mounted to pivot through a circular arc, the geometrical chords of said arcs being substantially perpendicular to one another, one of said gears rotatable and having peripheral teeth, the other of said gears having internal teeth the number of which exceed by one the number of teeth in said rotatable gear, means for pivoting each of said gears, said rotatable gear responsive to alternate successive pivoting of said gears away from a home position and then in the same sequence alternate successive pivoting of said gears back to a home position to cause a one station advance of said rotatable gear, whereby reversal of the sequence of said alternate successive pivoting of said gears to complete an excursion of each gear away from and back to a home position causes a one station retrogression of said rotatable gear.

6. An electro-mechanical accumulator as described in claim 5 having a plurality of said totalizers wherein each of said rotatable gears is provided with means for controlling the carry operation.

7. In an accounting machine, an accumulator comprising a rotatable accumulating element and a driving gear each pivotable with respect to the other, means responsive to a series of alternately established magnetic fields for alternately pivoting said element and said gear with respect to each other, said rotatable element responsive in either a forward or reverse direction according to the sequence of said series of alternately established magnetic fields, means for alternately establishing said fields, record sensing means and means controlled thereby for causing said establishing means to effect a series of alternations of said fields in a sequence and number dependent upon the differential location of perforations in a record.

8. In an accounting machine controlled by perforated cards, a driving gear and a rotatable accumulating element pivotable with respect to each other, a pair of magnetic fields alternately established and deenergized to alternatively pivot said gear and said element with respect to each other, record sensing means and means controlled thereby for causing alternate establishment of said fields and then alternate deenergization of said fields in successive sequence whereby said element will be advanced by increments in a positive or negative direction according to which of said fields is established first.

9. In an electric accounting machine, means for feeding record cards having differentially positioned index points, an accumulator element including a driven gear having peripheral teeth and a driving gear having internally cut teeth located for cooperation with said driven gear, said driven gear responsive rotatively in either direction of rotation to alternately successive pivoting of itself and said driving gear, means for alternately pivoting said gears successively, means for causing operation of said pivoting means to alternately pivot said gears in a predetermined sequence, record sensing means and means controlled thereby in response to a hole in a record for controlling the operation of said pivoting means to limit the number of alternately successive operations in accordance with the differential location of the hole in the record.

10. In an accounting machine, a rotatable accumulating element having peripheral teeth, a driving element having teeth located for cooperation with said teeth in said accumulating element, said accumulating element and said driving element being pivotable with respect to each other, pivoting of either of said elements with respect to the other element being effective to cause rotation of said accumulating element, means for repeatedly alternately pivoting said accumulating and driving elements in successive sequence to cause a step-by-step rotatable advance or retrogression of said accumulating element depending on whether said accumulating element or said driving element is pivoted first in the sequence, means for initiating the operation of said pivoting means, and means for determining the number of repeated operations to be performed by said pivoting means.

References Cited in the file of this patent

UNITED STATES PATENTS

| | | |
|---|---|---|
| 2,174,685 | Carroll et al. | Oct. 3, 1939 |
| 2,480,744 | Lake et al. | Aug. 30, 1949 |